Sept. 2, 1958     J. F. GORDON     2,849,979
INDICATOR KNOB
Filed June 30, 1955

INVENTOR
JAMES F. GORDON
BY HIS ATTORNEYS
HARRIS, KIECH, FOSTER, & HARRIS

United States Patent Office 2,849,979
Patented Sept. 2, 1958

2,849,979

INDICATOR KNOB

James F. Gordon, San Marino, Calif., assignor to Helipot Corporation, South Pasadena, Calif., a corporation of California Application June 30, 1955, Serial No. 519,202

10 Claims. (Cl. 116—133)

The present invention relates in general to indicators and, more particularly, to an indicator which includes a rotatable knob having an end wall through which a stationary indicating element within the knob is visible. The end wall of the knob and the indicating element within the knob are provided with cooperating indicia which indicate the angular position of the knob relative to a fixed reference so as to indicate the angular position of some device controlled by the knob relative to the same fixed reference. Either the end wall of the knob, or the indicating element within the knob, may be a dial having a plurality of circumferentially spaced indicia thereof and, for convenience, the indicating element within the knob will be considered as being a dial hereinafter.

The principal advantage of an indicator of the foregoing nature is that it permits the use of a large knob, thereby making the knob easier to manipulate, without, however, making the over-all diameter of the indicator excessive. This is due to the fact that the dial is housed within and is smaller than the knob, instead of being external to and larger than the knob.

Indicators of the foregoing general type face the problem of maintaining the dial within the knob stationary while still permitting full 360° rotation of the shaft or shaft means connecting the knob to the device controlled thereby so that the controlled device may be rotated through one or more complete revolutions. Various ways of holding the dial stationary while permitting full 360° rotation of the knob have been proposed in previous patents, but have not been entirely satisfactory, since they are subject to the disadvantage of either being unduly complex, or of not permitting full 360° rotation of the knob.

A general object of the present invention is to provide an indicator having stationary structural means of a very simple nature for holding the dial stationary while still permitting 360° rotation of the knob so that the device controlled by the knob may be rotated through one or more complete revolutions.

More particularly, a primary object of the invention is to provide an indicator wherein the end wall of the knob is secured to the shaft or shaft means, preferably to an end surface thereof. With this construction, there is an annular space available around the shaft or shaft means in which to locate the dial and in which to locate stationary structural means for holding the dial stationary. This annular space is completely unobstructed so that full 360° rotation of the knob is possible, which is an important feature of the invention.

Still more particularly, an important object of the invention is to provide an indicator wherein the stationary structural means in the annular space around the shaft or shaft means for holding the dial stationary, includes finger means extending longitudinally of the knob and located outwardly of the shaft or shaft means in the annular space mentioned, the finger means having an outer end connected to the dial and an inner end connected to a stationary supporting means. A related object is to provide a stationary finger means which includes a plurality of circumferentially spaced fingers the outer ends of which are connected to the dial and the inner ends of which are connected to the stationary supporting means.

Another object is to provide an indicator wherein the connections between the dial and the outer ends of the fingers for supporting the dial are located entirely behind the dial so they are not visible through the end wall of the knob through which the dial is viewed.

Another object is to provide an indicator wherein the supporting means for the dial-carrying finger means also supports the shaft or shaft means on which the knob is mounted. More particularly, an object in this connection is to provide a bearing for the shaft and to provide means for clamping the bearing and the finger means for supporting the dial to a mounting panel, or the like.

Another object is to provide a knob having a reference indicium thereon which is located on the surface of the transparent end wall of the knob which is nearest the dial to enable locating the indicium on the knob in close proximity to the indicia on the dial, thereby minimizing parallax.

Another object is to provide a knob carrying a knurled ring on its periphery. Preferably, the knob is cup-shaped and is entirely transparent for convenience in manufacture, the knurled ring being telescoped over the skirt of the knob to provide a convenient gripping surface on the periphery of the knob.

The foregoing objects, advantages, features and results of the present invention, together with various other objects, advantages, features and results thereof which will become evident in the light of this specification, may be obtained with the exemplary embodiment of the invention illustrated in the accompanying drawing and described in detail hereinafter.

Referring to the drawing.

Figure 1:
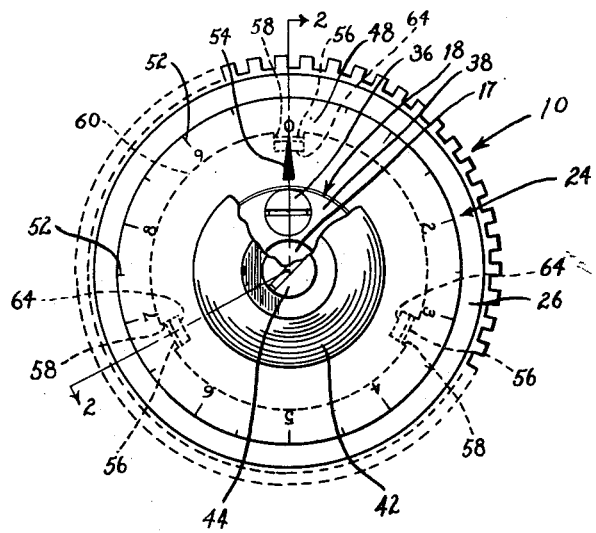
Fig. 1 is a front elevation of an indicator knob which embodies the present invention.

Considering in detail the embodiment of the indicator of the invention which is illustrated in the drawing, this indicator is designated generally by the numeral 10 and is shown mounted on a panel 12. The panel 12 is provided with an opening 14 through which extends a bearing 16 for a shaft 17 of a shaft means 18. The bearing 16 is externally threaded, nuts 20 and 22 being threaded on the bearing on opposite sides of the panel 12 to clamp the panel and another element, to be described, between the nuts, thereby mounting the indicator 10 on the panel. The shaft means 18 is connected to any suitable device, not shown, to be controlled by the indicator 10.

The indicator 10 includes a cup-shaped knob 24 which, for convenience in manufacture, is formed entirely of a transparent material, such as a transparent plastic, for example, this knob enclosing the projecting portion of the shaft means 18 on one side of the panel 12.

The knob 24 includes an end wall 26 and a peripheral skirt 28, the latter being provided with a shallow annular groove 30 in its exterior in which is disposed a knurled or serrated ring 32 to provide a convenient gripping surface. The ring 32 may be a section of a fluted plastic tubing sufficiently flexible to permit disposing the ring 32 in the groove 30.

The end wall 26 of the knob 24 is secured to an end surface 34 of the shaft means 18 by means of screws 36 threaded into a collar 38 which forms part of the shaft means and which is secured to the shaft 17 by means of a set screw 40. To provide a finished appearance, the screws 36 for securing the end wall 26 of the knob 24 to the end surface 34 of the shaft means 18 are covered by a central mask 42 secured to the end wall 24 of the knob by means of a single, central screw 44.

It will be noted that this construction, by connecting the end wall 26 of the knob 24 to the shaft means 18, provides an unobstructed annular space 46 within the knob and between the skirt 28 thereof and the shaft means. This unobstructed annular space is utilized to house an annular indicating element, preferably a dial 48, and stationary structural means 50 for stationarily holding the dial within the annular space in close proximity to and in parallelism with the end wall 26 of the knob. Also, since the annular space 46 is unobstructed, with no radial connections between the skirt 28 of the knob and the shaft means 18, except for those provided by the end wall 26 of the knob, full 360° rotation of the knob relative to the dial 48 and the stationary structural means 50 is provided, which is an important feature.

Figure 2:
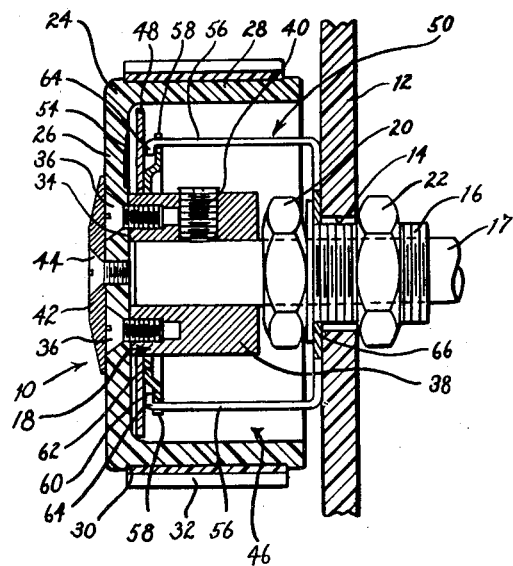
Fig. 2 is a sectional view taken along the irregular arrowed line 2—2 of Fig. 1 of the drawing.

Considering the dial 48, it may be of any suitable construction and provides indicia 52 thereon which are visible through the transparent end wall 26 of the knob 24. The end wall 26 carries an indicium 54 which ccoperates with the indicia 52 on the dial 48 to indicate the angular position of the knob 24, and thus the angular position of the shaft 17 and the angular position of a device, not shown, connected to the shaft and controlled by the knob. To minimize parallax, the indicium 54 is located on the inner side of the end wall 26, and may merely be scribed in the inner surface of the end wall, as shown in Fig. 2 of the drawing.

Considering the stationary structural means 50 for supporting the dial 48, it includes finger means comprising a plurality of longitudinally extending, circumferentially spaced, springlike fingers 56 the outer or free ends of which are disposed in notches 58 in an annular disc 60 behind the dial 48, these fingers being biased inwardly to grip the disc securely and steady it. The disc 60 is provided with a longitudinally offset annular flange 62 which is secured to the rear surface of the dial in any suitable manner, as by cementing, soldering, welding, or the like, depending upon the materials used for the disc and the dial. In order to retain the fingers 56 in the notches 58, the fingers are provided at their outer ends with inwardly bent flanges 64 which hook over the disc 60 and which fit between it and the dial 48.

The disc 60 and the dial 48 are journalled on the hub or collar 38 so that they are maintained coaxial with the shaft, the central holes through these elements being just slightly larger than the hub.

The inner or rear ends of the fingers 56 are interconnected by an annular web 66 which encircles the bearing 16 for the shaft 17, and which is clamped against the panel 12 by the nuts 20 and 22. Thus, the panel 12 and the bearing 17 serve as a stationary supporting means for both the shaft means 18 and the stationary structural means 50 for supporting the dial 48 within the knob 24 adjacent the end wall 26 thereof.

It will be noted that, with the foregoing construction, the dial 48 and the structural means 50 for supporting it offer no obstruction whatsoever to free rotation of the knob 24, whereby the knob may be rotated through one or more full revolutions, which is an important feature of the invention. Also, since the dial 48 is held stationary by the stationary structural means 50, the dial always forms a fixed reference for the indicium 54 on the knob without the oscillation, or other movement, which is encountered with pendulum-controlled dials, for example, of the prior art.

Although I have disclosed an exemplary embodiment of my invention herein for purposes of illustration, it will be understood that various changes, modifications and substitutions may be incorporated in such embodiment without departing from the spirit of the invention, particularly as defined by the allowed claims hereinafter appearing.

I claim as my invention:

1. In an indicator for a rotatable shaft, the combination of: supporting means providing an opening receiving said shaft; a cup-shaped knob having a skirt coaxial with said shaft and having a transparent end wall extending transversely of the axis of said shaft; means at the end of said shaft connecting a central zone of said transparent end wall to said shaft to provide a circumferentially continuous annular space within said skirt around said shaft; an indicating element within said knob and behind and parallel to said transparent end wall; and stationary, axially extending finger means located radially outwardly of said shaft and within said annular space for stationarily supporting said indicating element forwardly of said supporting means, said finger means being connected to said supporting means and said indicating element.

2. An indicator as defined in claim 1 wherein said finger means includes a plurality of circumferentially spaced fingers having outer ends connected to said indicating element and having interconnected inner ends connected to said supporting means.

3. An indicator as defined in claim 1 wherein said supporting means includes a bearing for said shaft and includes means for clamping said bearing and said finger means to a mounting panel.

4. In an indicator for a rotatable shaft, the combination of: a cup-shaped knob having an end wall and a peripheral skirt, said shaft being centrally located with respect to said knob and extending thereinto; means located radially inwardly of said skirt for connecting said end wall of said knob to said shaft; an indicating element within said knob adjacent said end wall thereof, said end wall of said knob having at least a portion which is transparent to permit viewing said indicating element therethrough; holding means within said knob radially outwardly of said shaft for fixedly holding said indicating element; and structural means connected to said holding means for stationarily supporting same.

5. An indicator as defined in claim 4 including a bearing for said shaft and including means threaded on said bearing for clamping said bearing and said structural means to said mounting panel.

6. An indicator as defined in claim 4 including a seprate knurled ring carried by said skirt of said knob exteriorly thereof.

7. In an indicator for a rotatable shaft, the combination of: a knob having an exterior surface extending substantially parallel to the axis of said shaft; means for connecting said knob to said shaft; an indicating element within said knob, said knob having at least a portion which is transparent for viewing of said indicating element therethrough; means within said knob for holding said indicating element stationary; and a separate ring carried by said knob exteriorly thereof and providing a roughened surface, said ring being formed of flexible material to surround and grip said exterior surface, said ring and said exterior surface having engaging shoulders determining the axial position of the ring on said exterior surface.

8. In an indicator for a rotatable shaft, the combination of: a collar and means for attaching same to said shaft, said collar terminating in an end surface; a knob enclosing said end portion of said collar and having an end connected to said end surface of said collar, said knob having an annular recess therein around said collar; an annular indicating element in said recess and visible through said end of said knob; and stationary structural means projecting longitudinally into said recess outwardly of said collar for holding said indicating element stationary.

9. An indicator as defined in claim 8 wherein said indicating element is journalled on said collar.

10. In an indicator for a rotatable shaft, the combination of: a cup-shaped knob having an end wall and a peripheral skirt, said knob being coaxial with said shaft and said shaft extending thereinto; means connecting said end wall of said knob to said shaft; an indicating element within said knob adjacent said end wall thereof, said end wall of said knob having at least a portion which is transparent to permit viewing said indicating element therethrough; a member within said knob behind said indicating element, said member being secured to said indicating element and having a peripheral portion which is axially spaced from said indicating element, said peripheral portion having circumferentially spaced notches therein; and holding means for said indicating element within said knob outwardly of said shaft for stationarily holding said indicating element, said holding means including circumferentially spaced, axially extending fingers disposed in said notches, respectively, and having inwardly turned forward ends disposed between said indicating element and said member.

References Cited in the file of this patent

UNITED STATES PATENTS

| | | |
|---|---|---|
| 2,220,590 | Vogt | Nov. 5, 1940 |
| 2,285,471 | Sturgess | June 9, 1942 |
| 2,350,733 | Drotning | June 6, 1944 |
| 2,619,932 | Brewster | Dec. 2, 1952 |